United States Patent [19]

Straub

[11] Patent Number: 5,137,305
[45] Date of Patent: Aug. 11, 1992

[54] PIPE COUPLING

[75] Inventor: Immanuel Straub, Wangs, Switzerland

[73] Assignee: Straub Federnfabrik AG, Wangs, Switzerland

[21] Appl. No.: 669,196

[22] Filed: Mar. 14, 1991

[30] Foreign Application Priority Data

Mar. 20, 1990 [CH] Switzerland ............... 911/90

[51] Int. Cl.$^5$ ..................................... A16L 17/025
[52] U.S. Cl. ..................................... 285/112; 285/373
[58] Field of Search ............... 285/373, 419, 367, 112, 285/410, 411

[56] References Cited

U.S. PATENT DOCUMENTS

| | | | |
|---|---|---|---|
| 2,409,576 | 10/1946 | Markey | 285/419 X |
| 2,602,678 | 7/1952 | Mahoff et al. | 285/367 X |
| 2,690,193 | 9/1954 | Smith | 285/373 X |
| 3,341,232 | 9/1967 | Deakins | 285/373 |
| 3,877,733 | 4/1975 | Straub . | |
| 4,365,393 | 12/1982 | Hauffe et al. | 285/373 X |
| 4,629,217 | 12/1986 | Straub . | |
| 4,664,422 | 5/1987 | Straub . | |
| 4,715,626 | 12/1987 | Gehring et al. | 285/373 X |
| 4,795,199 | 1/1989 | Gehring et al. . | |
| 4,822,083 | 4/1989 | Meinig | 285/367 |
| 4,986,575 | 1/1991 | Braun | 285/156 X |

FOREIGN PATENT DOCUMENTS

| | | |
|---|---|---|
| 0057373 | 8/1982 | European Pat. Off. . |
| 0175856 | 4/1986 | European Pat. Off. . |
| 0186728 | 7/1986 | European Pat. Off. . |
| G8706268.2 | 7/1987 | Fed. Rep. of Germany . |
| 80206516 | 6/1991 | Taiwan . |

Primary Examiner—Dave W. Arola
Attorney, Agent, or Firm—Willian Brinks Olds Hofer Gilson & Lione

[57] ABSTRACT

A pipe coupling has a cylindrical housing which is split in the longitudinal direction and has inwardly bent end walls and a steel insert sheet of analogous design bridging the gap in the housing. With the aid of a closure with tensioning screws, the housing can be constricted in the manner of a pipe clip, such that a sealing sleeve positioned between the housing and a pipe is compressed in the circumferential direction and brought to bear on the pipes to be sealed off. The closure is offset in the circumferential direction with respect to the housing gap, and the end section of the housing projecting through the region of the tensioning screws is overlapped by a slideway anchored on the other end section. By this means, dimensional stability is increased without increasing the wall thickness, or the constrictability of the housing is guaranteed despite an increased wall thickness.

5 Claims, 2 Drawing Sheets

PIPE COUPLING

BACKGROUND OF THE INVENTION

The invention relates to a pipe coupling of the type comprising a C-shaped elastomeric sealing sleeve having a sleeve web and at least two sealing lips which extend toward one another and are supported on the sleeve web; a housing comprising a cylindrical jacket which comprises two end sections which define a gap therebetween; a closure coupled to the housing and comprising at least one tensioning screw operative to constrict the jacket; and an insert sheet inserted between the sleeve and the housing to bridge the gap; wherein the cylindrical jacket and the insert sheet define radially extending end walls, and wherein the sealing lips have a first, larger dimension prior to operation of the closure and a second, smaller dimension after operation of the closure has compressed the sealing sleeve in a circumferential direction such that the sealing sleeve can be installed over a pipe prior to operation of the closure and then firmly pressed against the pipe by the jacket and the closure.

Pipe couplings of this type, as disclosed for example in German Patent 2,428,101 and corresponding U.S. Pat. No. 3,877,733, have revolutionized pipe connection technology. On the one hand, due to the fact that the sealing lips of the pipe coupling are initially larger than the nominal diameter of the pipes to be connected, it is possible for the coupling to be pushed onto one of the pipes in the pre-assembled state and to install the coupling together with the pipes. The pipes can then be placed next to one another and the couplings can be pushed over the joints. On the other hand, when the sealing lips of the pipe coupling are compressed in the circumferential direction by the constrictable housing, the radial thickness of the seal increases so that the seal is not only pressed against the pipe wall by the housing, but also tends to mold itself to the pipe surface. This results in a sealing capability which is fully satisfactory even in the case of a rough or irregular pipe surface and which additionally remains intact for a long time.

One important object of the present invention is to modify the known pipe coupling for higher maximum operating pressures in such a way that the wall thickness of the web does not have to be increased from the viewpoint of the dimensional stability of the housing. It is another object to increase the dimensional stability of the housing by an amount which is greater than that corresponding to the increase in the wall thickness, in which case, inversely, the constrictability of the housing is to be guaranteed even with an increased wall thickness. It is another object to increase pressure resistance of the coupling to extremely high pressures by an actual, so-called "lightweight construction". This is understood to be a construction which is even capable of compensating for the deformability of the housing, which increases with the diameter of the coupling (in orders of magnitude of 2 meters and over), without the wall thickness having to be increased for this purpose. In this case, the support surfaces contacting the seal are intended to be essentially cylindrical and the steel insert sheet for this purpose is intended to remain as thin-walled as possible despite higher pressures.

SUMMARY OF THE INVENTION

According to this invention, an improved pipe coupling of the type initially described above is provided wherein the closure is offset with respect to the gap circumferentially, and wherein the housing comprises a slideway positioned to bridge the gap in the housing, said slideway projecting below the tensioning screw and having a first portion anchored on one of the end sections of the jacket and a curved guiding surface overlapping the other end section of the jacket.

Because the closure is offset out of the region of the gap, the closure is stabilized or relieved during assembly by the end section of the housing which projects under the region of the tensioning screw. In contrast to the prior art housing sections discussed above, this housing section is not pulled, but thrust, the change in shape arising during constriction of the housing not merely by the action of the tensioning screws, but also by the action of the slideway. By this means, the regular constrictability of the housing is fully retained, even if the wall thickness is increased.

On the other hand, while it is still constrictable, the housing described below behaves like a closed ring insofar as its end sections are no longer interconnected only by the tensioning screws, but are also supported against one another, such as is the case, for example, in the tensioning bushing for pipes described in EP 0,186,728 A1 and corresponding U.S. Pat. No. 4,795,199, but without the end sections of the housing requiring different constructions in order to be able to be plugged together. In the known tensioning bushing of EP 0,186,728 A1 and U.S. Pat. No. 4,795,199, the steel insert sheet is to be omitted. In contrast, in the pipe coupling described below the steel insert sheet remains intact and the housing is split longitudinally, but it is continuous in the region of the closure so that any undesired deformations are counteracted not merely by the friction prevailing between the closure parts, but also by the inherent rigidity of the housing: deformations which tend to produce extremely high pressures in the sections of the housing extending laterally away from the closure cannot lead to a constriction in the sleeve cross-section in the region of the closure.

Further advantageous features of the invention are set out in the dependent claims.

BRIEF DESCRIPTION OF THE DRAWINGS

The invention is explained in greater detail below with reference to the preferred embodiments illustrated in the drawings, in which.

DETAILED DESCRIPTION OF THE PREFERRED EMBODIMENTS

Figure 1:
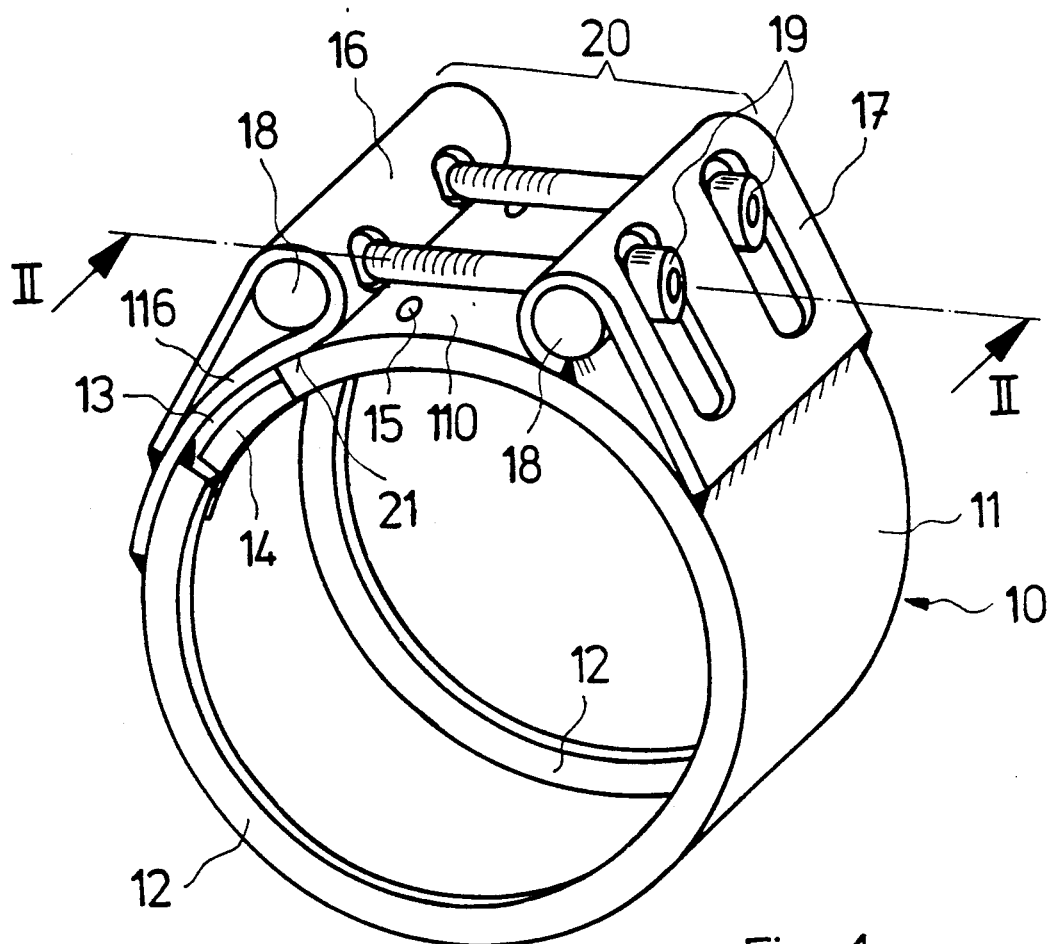
FIG. 1 is a perspective view of a first preferred embodiment of the coupling housing of this invention without the sealing sleeve.
Figure 2:
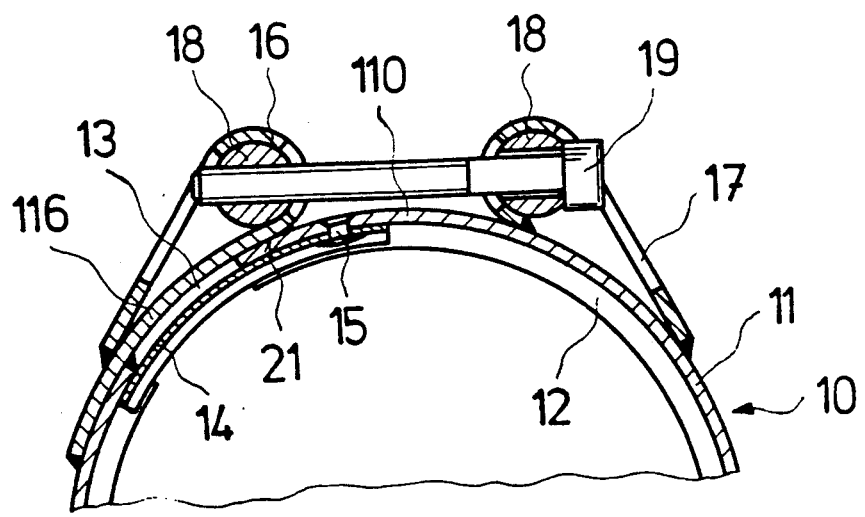
FIG. 2 is a sectional view taken along the line II—II of FIG. 1.

The housing 10 illustrated in FIG. 1 is split along its length and has a cylindrical jacket 11 with inwardly bent end walls 12. A steel insert sheet 14 bridges the housing gap 13 and is of analogous construction so that the elastomeric sealing sleeve (not illustrated) is enclosed around the circumference and at the end faces. The sealing sleeve used with the housing 10 can be of the conventional type which is C-shaped in cross section and includes a sleeve web and at least two sealing lips which extend toward one another and are supported by the sleeve web by means of an annular bead on the sleeve. See, for example the sealing sleeve shown in above referenced German Patent 2,428,101. It can be seen in FIG. 2 that the steel insert sheet 14 is anchored at 15 on one of the end sections of the housing jacket 11 extending toward the gap 13.

Welded onto the cylindrical jacket 11 at the housing gap 13 are two tensioning straps 16, 17, the free ends of which are each bent round to surround a respective one of the tensioning bars 18, which, in turn, are interconnected by means of two tensioning screws 19. The parts 16 to 19 form a closure denoted together as 20 which is offset in the circumferential direction with respect to the gap 13. The arrangement is such that the end section 110 of the housing extending under the tensioning screws 19 projects under the tensioning strap 16 which forms a slideway 21 for this end section. For this purpose, the tensioning strap 16 has a stable anchorage by the fact that its inner limb 116 extends far beyond the housing gap 13 and is connected to the jacket 11 of the housing at two points spaced apart in the circumferential direction.

By tightening the two tensioning screws 19, the inside diameter of the overall housing 10 can be reduced as in the case of a pipe clip. In this case, the end section 110 of the housing projecting under the slideway 21 is thrust into the space below the tensioning strap 16 in the direction toward the other end section. The coupling housing, although it is still fully constrictable, constitutes a housing of continuous construction in the region of the closure 20. By this means, a greater wall thickness is also compensated in respect of the regular constrictability of the housing and the stability of the closed coupling housing is increased beyond the measure which would result from a given wall thickness.

Seen in other terms, it emerges that, due to the closure being offset in relation to the gap, the housing is divided into two segments of continuously identical cross-section, of which the one segment is pulled and the other is thrust below the slideway without radial offset. In the closed state, the housing gap and the joint do not lie one above the other between the tensioning straps, but rather the joint lies above a continuous housing section which stabilizes the closure in the radial direction and prevents deformation under the effect of compression in the closure region and in the laterally adjoining regions.

Figure 3:
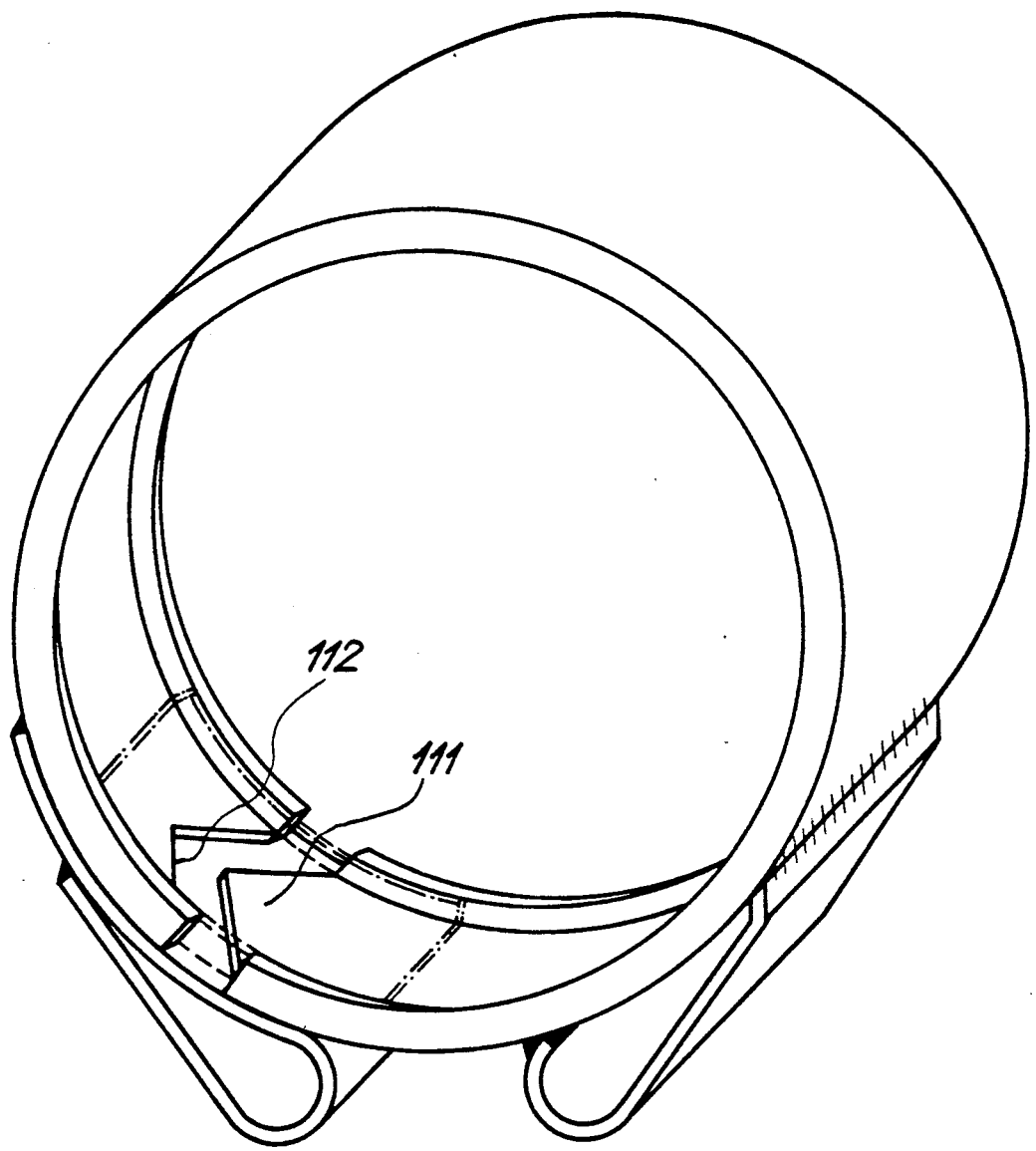
FIG. 3 is a perspective view of a second preferred embodiment of the coupling housing of this invention.

In the variant shown in FIG. 3, the housing jacket has on one of its end sections a support tongue 111 which, in the assembled state, engages in a corresponding recess 112 in the other end section which defines a substantially complementary shape. In this case, quite considerable pipe tolerances can be accommodated; the thin steel insert sheet is then adequately supported against high pressures even if the gap remains wide open, e.g. in a pipe with maximum deviation of the diameter from the nominal bore on the plus side.

Of course, it should be understood that a wide range of changes and modifications can be made to the preferred embodiments described above. It is therefore intended that the foregoing detailed description be regarded as illustrative rather than limiting, and that it be understood that it is the following claims, including all equivalents, which are intended to define the scope of this invention.

I claim:

1. In a pipe coupling of the type comprising an elastomeric sealing sleeve having a sleeve web and at least two sealing lips which extend toward one another and are supported on the sleeve web, said sealing sleeve being C-shaped in cross section; a housing comprising a cylindrical jacket which comprises two end sections which define a longitudinal gap therebetween; a closure coupled to the housing and comprising at least one tensioning screw operative to constrict the jacket; an insert sheet positioned between the sleeve and the housing to bridge the gap; said cylindrical jacket and insert sheet defining radially extending end walls; said sealing lips having a first, larger dimension prior to operation of the closure and a second, smaller dimension in a circumferential direction such that the sealing sleeve can be installed over a pipe prior to operation of the closure and then firmly pressed against the pipe by the jacket and the closure; the improvement wherein:

the closure is offset with respect to the gap circumferentially; and the housing comprises a slideway positioned to bridge the gap in the housing, said slideway projecting below the tensioning screw, and said slideway comprising a first portion anchored on one of the end sections of the jacket and a curved guiding surface overlapping the other end section of the jacket.

2. The invention of claim 1 wherein one of the end sections of the jacket defines at least one support tongue, and wherein the other of the end sections of the jacket defines a substantially complementary shape.

3. The invention of claim 1 wherein the housing comprises:

a pair of tensioning straps, each secured to a respective one of the end sections; and a pair of tensioning bars, each coupled to a respective one of the tensioning straps and to the tensioning screw;

wherein the slideway is defined by a portion of one of the tensioning straps.

4. The invention of claim 3 wherein said portion of said one of the tensioning straps comprises an edge section which overlaps the respective end section of the jacket, wherein the edge section is secured to the respective end section of the jacket at a plurality of circumferentially offset points.

5. The invention of claim 1 further comprising means for anchoring the insert sheet to the end section of the housing that projects under the slideway.

* * * * *

UNITED STATES PATENT AND TRADEMARK OFFICE
CERTIFICATE OF CORRECTION

PATENT NO. : 5,137,305
DATED : August 11, 1992
INVENTOR(S) : IMMANUEL STRAUB It is certified that error appears in the above-identified patent and that said Letters Patent is hereby corrected as shown below:

On the title page, item [30]:
IN THE FOREIGN APPLICATION PRIORITY DATA

In column 1 of the title page, after "Switzerland" delete "911/90" and substitute therefor --911/90-4--.

Column 4:

In claim 1, line 23, after "dimension" please insert --after operation of the closure has compressed the sleeve--.

Signed and Sealed this

Eleventh Day of January, 1994

Attest:

BRUCE LEHMAN

*Attesting Officer*      *Commissioner of Patents and Trademarks*